United States Patent [19]

Yoshizawa et al.

[11] Patent Number: 4,848,505
[45] Date of Patent: Jul. 18, 1989

[54] AUTOMOBILE DRIVING FORCE CONTROL APPARATUS

[75] Inventors: Katsuyuki Yoshizawa; Tsutomu Sawada, both of Kanagawa, Japan

[73] Assignee: Nissan Motor Co., Ltd., Yokohama, Japan

[21] Appl. No.: 145,070

[22] Filed: Jan. 19, 1988

[30] Foreign Application Priority Data

Jan. 19, 1987 [JP] Japan .................................. 62-4961[U]

[51] Int. Cl.⁴ ............................................. B60K 31/00
[52] U.S. Cl. ...................................... 180/197; 123/396
[58] Field of Search ................ 180/197; 123/396, 399, 123/403, 361

[56] References Cited

U.S. PATENT DOCUMENTS 4,548,176 10/1985 Ishida et al. ..................... 123/396
4,703,823 11/1987 Yogo et al. ...................... 123/399
4,727,837 3/1988 Sturdy ............................. 123/396

Primary Examiner—Charles A. Marmor
Assistant Examiner—Donn McGiehan
Attorney, Agent, or Firm—Foley & Lardner, Schwartz, Jeffery, Schwaab, Mack, Blumenthal & Evans

[57] ABSTRACT

An apparatus for controlling a throttle valve situated for rotation within an engine induction passage. The apparatus includes a throttle driving unit mechanically coupled to the accelerator pedal for rotating the throttle valve in response to an extent to which the accelerator pedal is depressed. A control circuit is provided for producing an electrical control signal in accordance with automobile running conditions. The control signal is applied to a throttle actuator which thereby produces a driving force to the throttle driving unit for rotating the throttle valve. The throttle driving unit has a structure for restricting rotation of the throttle valve in an opening direction to a degree determined by the extent to which the accelerator pedal is depressed so as to provide a positive prevention of automobile reckless driving.

8 Claims, 5 Drawing Sheets

AUTOMOBILE DRIVING FORCE CONTROL APPARATUS

BACKGROUND OF THE INVENTION

This invention relates to an apparatus for use with an automobile for controlling a throttle valve situated for rotation within an engine induction passage.

In order to meter the amount of air to an internal combustion engine, a variable positionable throttle valve is situated within the induction passage of the engine. Normally, a mechanical link mechanism is provided to couple the throttle valve to an accelerator pedal in a manner to move the throttle valve in response to movement of the accelerator pedal. It has been proposed to employ such a mechanical throttle control apparatus with an electrical throttle control apparatus. For example, Japanese Patent Kokai No. 58-167845 discloses an electrical throttle control apparatus used with a normal mechanical throttle control apparatus. The electrical control apparatus is arranged to force the throttle valve to move in a closing direction when the slip factor exceeds a predetermined value. A serious problem which occurs with such a conventional throttle control system is the danger of the automobile going out of control due to unreasonable throttle valve opening operation which may be performed when trouble occurs in the electrical throttle control apparatus for a variety of reasons.

SUMMARY OF THE INVENTION

Therefore, a main object of the invention is to provide an improved throttle control apparatus which provides uncontrolled operation certain prevention of automobile of an automobile.

There is provided, in accordance with the invention, an apparatus for use in an automobile including an internal combustion engine having an accelerator pedal and a throttle valve situated for rotation within an engine induction passage. The apparatus comprises a throttle driving unit mechanically coupled to the accelerator pedal for rotating the throttle valve in response to an extent to which the accelerator pedal is depressed. A control circuit is provided for producing an electric control signal in accordance with automobile running conditions. The controls signal is applied to a throttle actuator which thereby produces a driving force to the throttle driving unit for rotating the throttle valve. The throttle driving unit includes means for restricting rotation of the throttle valve in an opening direction to a degree determined by the extent to which the accelerator pedal is depressed.

BRIEF DESCRIPTION OF THE DRAWINGS

This invention will be described in greater detail by reference to the following description taken in connection with the accompanying drawings, in which like reference numerals refer to the same or corresponding parts, and wherein.

DETAILED DESCRIPTION OF THE INVENTION

Figure 1:
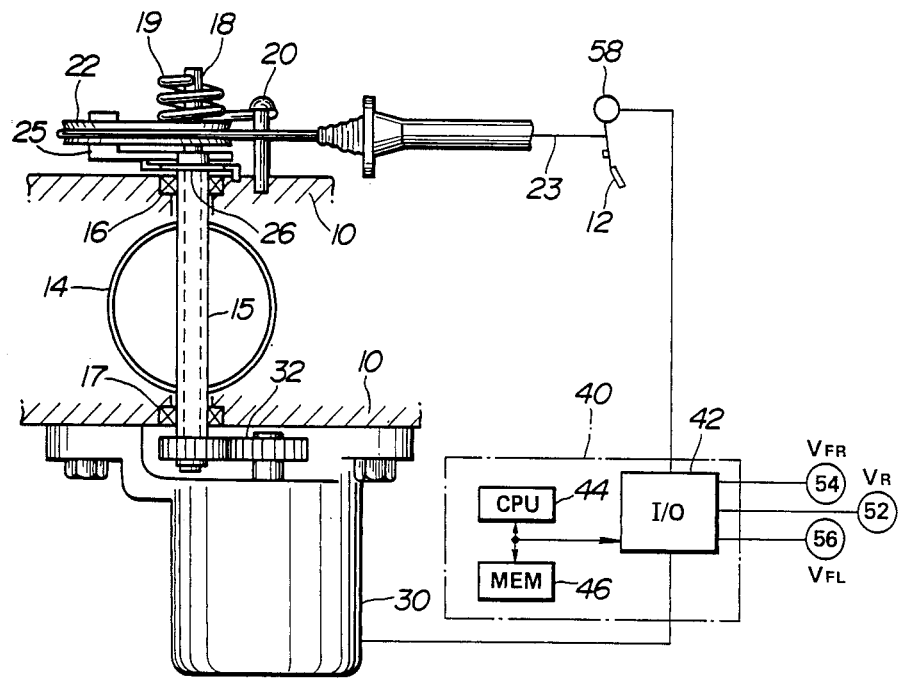
FIG. 1 is a partially sectional view showing one embodiment of the throttle control apparatus made in accordance with the invention.
Figure 2:
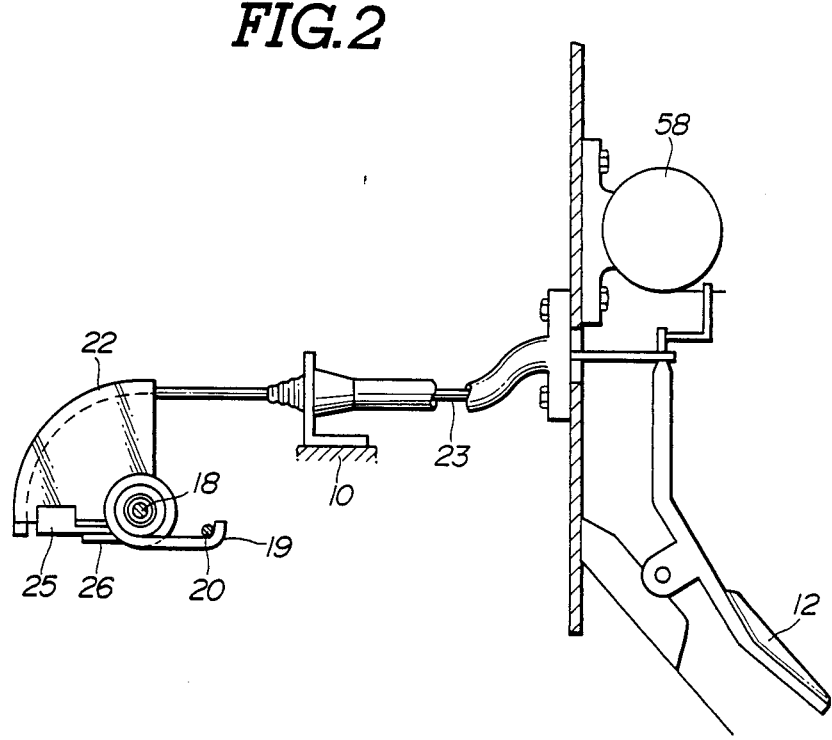
FIG. 2 is a fragmentary schematic view showing the mechanism coupling the accelerator pedal to the throttle shaft.

With reference to the drawings, wherein like numerals refer to like parts in the several views, and in particular to FIGS. 1 and 2, there is shown an automobile driving force control apparatus embodying the present invention. The numeral 10 designates a passage wall defining an engine induction passage 11 within which a variable positionable throttle valve 14 is situated for rotation to control the flow of air or combustible mixture from the induction passage 11 into the engine. The throttle valve 14 is fixedly secured on a hollow shaft 15 rotatably mounted near its opposite ends on the passage wall 10 through bearings 16 and 17. A drive shaft 18, which extends through the hollow shaft 15, is supported on the hollow shaft 15 for rotation separately from the hollow shaft. The drive shaft 18 is urged in a counter-clockwise direction, as viewed in FIG. 2, by a return spring 19, one end of which is secured on the drive shaft 18, the other end of the return spring being abutted on a stop pin 20 fixedly embedded in the passage wall 10.

The drive shaft 18 has a wire drum 22 fixedly secured thereon for rotation in unison therewith. The wire drum 22 is taken in the form of a sector plate having two side surfaces and a grooved peripheral surface, as best shown in FIG. 2. The wire drum 22 is mechanically connected through a wire 23 to the accelerator pedal 12. The wire 23 has one end fixedly secured to the accelerator pedal 12, the other end of the wire 23 being fixedly secured on the wire drum 22 having a part of the wire 23 wound around its groove peripheral surface. The hollow shaft 13 has a stopper 25 fixedly secured thereon near its upper end for rotation in unison therewith. The stopper 25 has a turned free end for engagement with one of the side surfaces of the wire drum 22. A return spring 26 urges the stopper 25 in a clockwise direction, as viewed in FIG. 2, into abutment against the wire drum 22. The resilient force f of the return spring 26 is chosen to be smaller than half the resilient force F of the return spring 19.

When the accelerator pedal 12 is depressed from its released position, the wire 23 rotates the wire drum 22 in the clockwise direction, as viewed in FIG. 2, along with the drive shaft 18 against the resilient force of the return spring 19. This rotation of the wire drum 22 permits the stopper 25 to rotate in the clockwise direction, as viewed in FIG. 2, under the resilient force of the return spring 26. As a result, the hollow shaft 15, which is fixedly secured to the stopper 25, rotates in a direction opening the throttle valve 14. When the accelerator pedal 12 is released, the wire drum 22 rotates in the counter-clockwise direction, as viewed in FIG. 2, along with the drive shaft 18 under the resilient force of the return spring 19. During this rotation of the wire drum 22, the wire drum 22 pushes the stopper 25 in the counter-clockwise direction, as viewed in FIG. 2, against the resilient force of the return spring 26. As a result, the hollow shaft 15 rotates in a direction closing the throttle valve 14. Accordingly, the degree to which the accelerator pedal 12 is depressed controls the degree of rotation of the throttle valve 14.

The numeral 30 designates a throttle actuator of the type including a control motor such as a DC motor or the like having an input shaft coupled to the hollow shaft 15 through a reduction gear unit 32. The throttle actuator 30 is electrically connected to a control circuit 40. The control circuit 40 calculates a slip factor S and produces a control signal when the calculated slip factor S is greater than a predetermined value. The control signal is applied from the control circuit 40 to the throttle actuator 32, causing the control motor to produce a driving force through the reduction gear unit 32 to rotate the hollow shaft 15 in a direction closing the throttle valve 14 so as to reduce the extent of the undesirable slip which occurs between the driving wheel and the road surface. The driving force M applied to rotate the hollow shaft 15 is selected to establish the following relationship:

$$f < M < F - f$$

where f is the resilient force of the return spring 26, and F is the resilient force of the return spring 19.

When the driving force M is applied to rotate the hollow shaft 15 in a direction closing the throttle valve 14, the stopper 25 rotates, along with the hollow shaft 15, in the counter-clockwise direction, as viewed in FIG. 2, away from the wire drum 22 against the resilient force f of the return spring 21 which is smaller than the driving force M. It is to be noted that the movement of the throttle valve 14 in the closing direction is independent from the position of the accelerator pedal 12. If a trouble occurs in the control circuit 40 to cause the control motor to rotate the hollow shaft 15 in the reverse direction opening the throttle valve 14 for any of reasons, the stopper 25 abuts against the wire drum 22 under a force M+f. Since the resilient force F of the return spring 19 is selected to be greater than the force M+f, the rotation of the stopper 25 and thus the hollow shaft 15 is limited by the wire drum 22. As a result, the throttle valve 14 cannot open over the degree determined by the extend to which the accelerator pedal 12 is depressed. This is effective to ensure the positive prevention of uncontrolled operation of the automobile.

The control circuit 40 receives inputs from wheel speed sensors each of which may include a magnetic pickup transducer or the like provided for corresponding one of the driving and non-driving wheels of the automobile for producing pulses of a repetition rate directly proportional to the speed of the corresponding wheel. These wheel speed sensors include a driving wheel rotational speed sensors 52, a right non-driving wheel rotational speed sensor 54, and a left non-driving wheel rotational speed sensor 54. The driving wheel rotational speed sensor 52 produces a signal indicative of the speed VR of rotation of the driving wheel of the automobile. The right non-driving wheel rotational speed sensor 54 produces a signal indicative of the speed VFR of rotation of the right non-driving wheel of the automobile. The left non-driving wheel rotational speed sensor 56 produces a signal indicative of the speed VFL of rotation of the left non-driving wheel of the automobile. The control circuit 40 calculates a value VF for the non-driving wheel rotational speed by averaging the right and left non-driving wheel rotational speeds VFR and VFL. The control circuit 40 calculates a slip factor S as $S=(VR-VF)/VR$. The control circuit 40 produces the control signal to the throttle actuator 30 when the calculator slip factor S is greater than a predetermined value So.

The control circuit 40 may employ a digital computer which small by regarded as including an input/output unit (I/O), a central processing unit (CPU), and a memory (MEM). The input/output unit (I/O) receives the digital signals VR, VFR and VFL from the sensors. The memory includes a read/write memory (RAM) and a read only memory (ROM) which contains the program for operating the central processing unit. Control words specifying a desired throttle valve position are periodically transferred by the central processing unit to the input/output control unit. The input/output control unit converts the transferred information into analog form and applies a control signal to the throttle actuator 30 for controlling the direction and degree of motion of the control motor.

Figure 3:
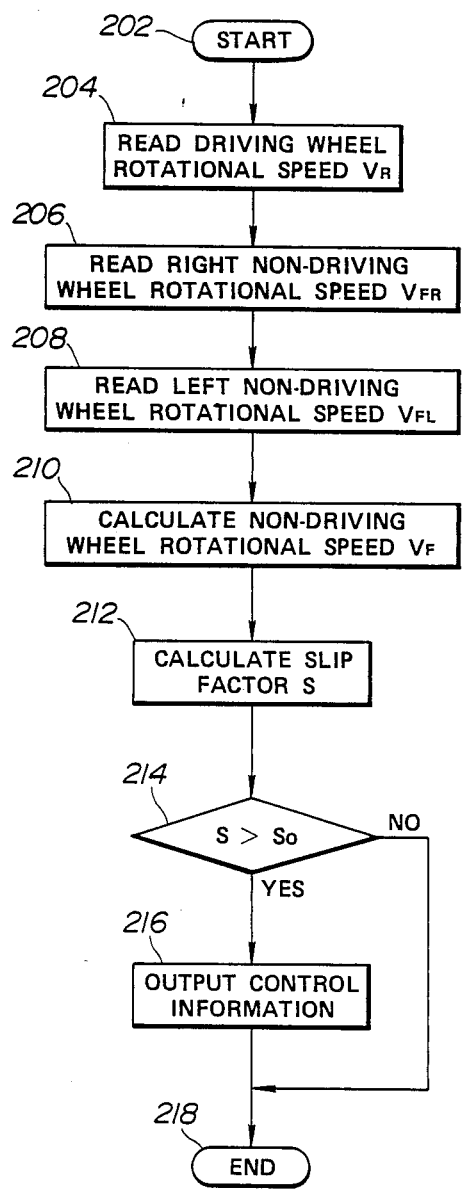
FIG. 3 is a flow diagram showing the programming of the digital computer used in the apparatus of FIG. 1.

FIG. 3 is a flow diagram of the programming of the digital computer used in the control circuit 40. The computer program is entered at the point 202 at appropriate times. Following this, the driving-wheel rotational speed VR, right non-driving wheel rotational speed VFR and left non-driving wheel rotational speed VFL are, one by one, read into the computer memory. Thus, at the point 204 in the program, the driving wheel rotational speed is read into the computer memory. At the point 206, the right non-driving wheel rotational speed VFR is read into the computer memory. Similarly, at the point 208, the left non-driving wheel rotational speed VFL is read into the computer memory.

At the point 210 in the program, the central processing unit calculates a value VF for the non-driving wheel rotational speed VF as a function of the right and left non-driving wheel rotational speeds VFR and VFL. This calculation is made by averaging the right and left non-driving wheel rotational speeds VFR and VFL as $VF=(VFR+VFL)/2$. At the point 212, the central processing unit calculates a value S for the existing slip factor as a function of the driving wheel rotational speed VR and the calculated non-driving wheel rotational speed VF. This calculation is made as $S=(VR-VF)/VR$.

At the point 214 in the program, a determination is made as to whether or not the calculated slip factor S is greater than a predetermined value So. If the answer to this question is "yes", then it means that undesirable great slip occurs between the driving wheel and the road surface and the program proceeds to the point 216 where command data are transferred to the input/output control unit which thereby producing a control signal to the throttle actuator 30 for moving the control motor in a direction closing the throttle valve 14. Following this, the program proceeds to the end point 218. If the answer to the question inputted at the point 214 is "no", then it means that no undesired slip occurs between the driving wheel and the road surface and the program proceeds directly to the end point 218.

The control circuit 40 may be arranged to determine a value corresponding to a setting of the position of the throttle valve 14 in response to a change in the position of the accelerator pedal 58. In this case, the throttle actuator 30 rotates the hollow shaft 15 to move the throttle valve to the determined setting. For this purpose, the control circuit 40 receives an additional input from a position sensor 58 which produces a signal indicative of the extent to which the accelerator pedal 12 is depressed. This modifications effective to move the throttle valve in a closing direction accordingly to the extent to which the accelerator pedal 12 is depressed even though a trouble occurs on the line mechanically coupling the accelerator pedal 12 to the throttle valve 14.

Figure 4:
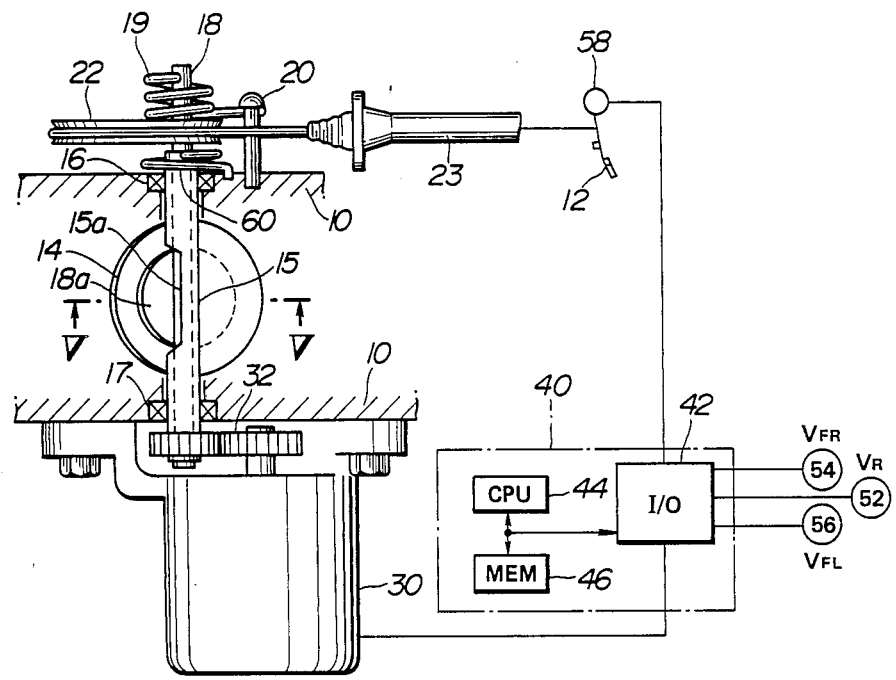
FIG. 4 is a partially sectional view showing a second embodiment of the invention.
Figure 5:
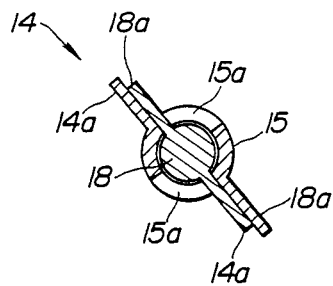
FIGS. 5 and 6 are sectional views taken along the lines V—V of FIG. 4.
Figure 6:
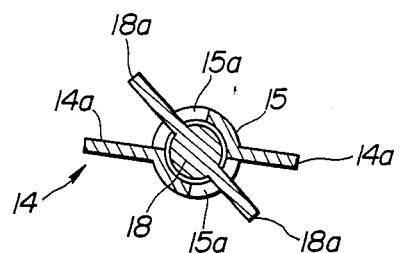

Referring to FIGS. 4 through 6, there is illustrated a second embodiment of the invention. Like reference numerals have been applied to FIG. 4 with respect to the equivalent components shown in FIG. 1. In this embodiment, the stopper 25 (FIG. 1) is removed and replaced with a pair of stopper plates 18a extending in the opposite directions from the drive shaft 18. The hollow shaft 15 has two openings 15a therein through which the respective stopper plates 18a extends outwardly. The throttle valve 14 has two throttle valve plate 14a extending outwardly from the hollow shaft 15 at positions adjacent to one edges of the openings 15a. The openings 15a have such a width that the drive shaft 18 can rotates at a predetermined angle with respect to the hollow shaft 15. The return spring 26 (FIG. 1) is removed and replaced with a return spring 60, one end of which is fixedly secured on the passage wall 10, the other end of the return spring 60 being fixedly secured on the hollow shaft 15 for urging the hollow shaft 15 in a direction bringing the throttle valve plates 14a into abutment with the respective stopper plates 14a. Similar to the first embodiment of FIG. 1, the driving force M applied to rotate the hollow shaft 15 through the reduction gear unit 32 is selected to establish the following relationship:

$$f' < M < F - f'$$

where f' is the resilient force of the return spring 60, and F is the resilient force of the return spring 19.

The operation is as follows: When the accelerator pedal 12 is depressed from its released position, the wire 23 rotates the wire drum 22 along with the drive shaft 18 against the resilient force of the return spring 19. This rotation of the drive shaft 18 permits the throttle valve plates 14a to follow the rotation of the stopper plates 14a under the resilient force of the return spring 60. As a result, the throttle valve 14 moves into its opening direction. The degree to which the throttle valve 14 opens corresponds to the extent to which the accelerator pedal 12 is depressed. When the accelerator pedal 12 is released, the wire drum 22 rotates along with the drive shaft 18 under the resilient force of the return spring 19. During this rotation of the drive shaft 18, the stopper plates 18a push the respective throttle plates 14a to close the throttle valve 14 against the resilient force of the return spring 60 which is smaller than the resilient force of the return spring 19. Accordingly, the degree to which the accelerator pedal 12 is depressed controls the degree of rotation of the throttle valve 14.

When a driving force M is applied through the reduction gear unit 32 to rotate the hollow shaft 15 in a direction closing the throttle valve 14, the throttle plates 14a moves in a counter-clockwise direction, as viewed in FIG. 5, against the resilient force of the return spring 60 which is smaller than the driving force M. It is to be noted that the movement of the throttle valve 14 in the closing direction is independent from the position of the accelerator pedal 12. If a trouble occurs in the control circuit 40 to cause the control motor to rotate the hollow shaft 15 in the reverse direction opening the throttle valve 14 for any of reasons, the throttle plates 14a abuts against the respective stopper plates 15a under a force M+f'. Since the resilient force F of the return spring 19 is selected to be greater than the force M+f', the rotation of the throttle plates 14a and thus the hollow post 15 is limited by the stopper plates 18a. As a result, the throttle valve 14 cannot open over the degree determined by the extent to which the accelerator pedal 12 is depressed. This is effective to ensure the positive prevention of uncontrolled operation of the automobile.

Figure 8:
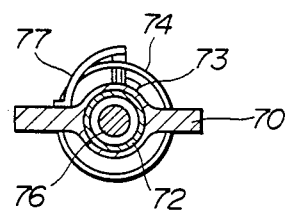
FIG. 8 is a sectional view taken along the line VIII—VIII of FIG. 7.
Figure 7:
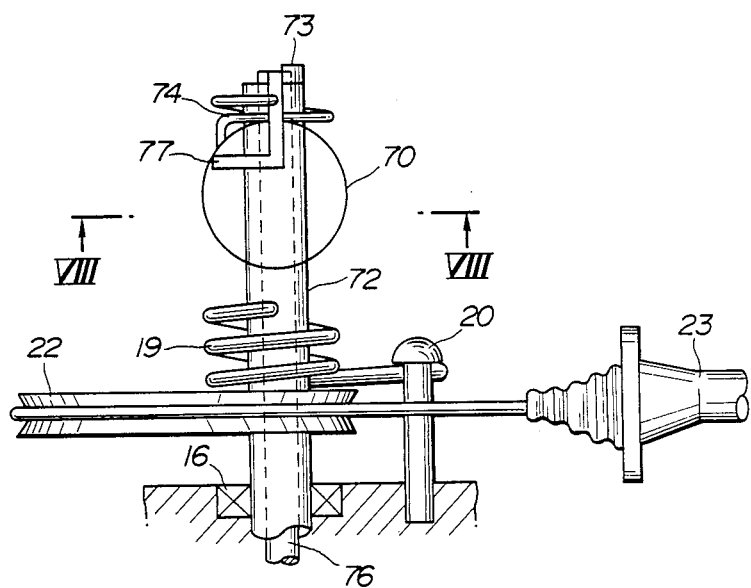
FIG. 7 is a fragmentary schematic view showing a third embodiment of the invention.

Referring to FIGS. 7 and 8, there is illustrated a third embodiment of the invention. like reference numerals have been applied to FIG. 7 with respect to the equivalent components shown in FIG. 1. In this embodiment, a throttle valve 70 is resiliently supported on a hollow throttle shaft 72 through a throttle valve return spring 74. The hollow throttle shaft 72 has a stopper 73 fixedly secured thereon. A drive rod 76, which extends through the hollow throttle shaft 72, is coupled through the reduction gear unit 32 (FIG. 1) to the throttle actuator 30 (FIG. 1). The drive shaft 76 has a projection 77 formed thereon. The projection 77 is held in engagement with the throttle valve 70 and the stopper 73 when no driving force is applied through the reduction gear unit to the driving shaft 76. The driving force M applied to rotate the drive shaft 76 is selected to establish the following relationship:

$$f'' < M < F - f''$$

where f'' is the resilient force of the throttle valve return spring 74 and F is the resilient force of the return spring 19.

When a great slip occurs between the driving wheel and the road surface, a controls signal is produced to cause the throttle actuator 30 to rotates the drive shaft 76 in a direction closing the throttle valve 70 against the force of the throttle valve return spring 74. If a trouble occurs in the control circuit 40 to cause the throttle actuator to rotate the drive shaft 76 in the reverse direction opening the throttle valve 70 for any of reasons, the stopper 73 abuts against the projection 77 to restrict the rotation of the drive shaft 77. As a result, the throttle valve 70 cannot open over the degree determined by the extent to which the accelerator pedal 12 is depressed. This is effective to ensure the positive prevention of automobile reckless driving.

It is apparent from the forgoing that there has been provided, in accordance with the invention, a throttle driving unit mechanically coupled to an accelerator pedal for rotating the throttle valve in response to an extent to which the accelerator pedal is depressed and also drivingly coupled to a throttle actuator for producing a driving force to the throttle driving unit for rotating the throttle valve in response to an electrical control signal. The throttle driving unit includes means for limiting rotation of the throttle valve in an opening direction to a degree determined by the extent to which the accelerator pedal is depressed. This is effective to ensure the prevention of automobile reckless driving.

What is claimed is:

1. An apparatus for use in an automobile including an internal combustion engine having an accelerator pedal and a throttle valve situated for rotation within an engine indication passage, comprising:

a throttle driving unit mechanically coupled to the accelerator pedal for rotating the throttle valve in response to an extent to which the accelerator pedal is depressed;

a control circuit for producing an electric control signal in accordance with automobile running conditions; and a throttle actuator responsive to the control signal fed thereto from the control circuit for providing a driving force to the throttle driving unit for rotating the throttle valve;

wherein the throttle driving unit includes means for restricting rotation of the throttle valve in an opening direction to a degree determined by the extent to which the accelerator pedal is depressed, and wherein the means for restricting rotation includes a first shaft having the throttle valve secured thereon for rotation in unison therewith, the first shaft being drivingly coupled to the throttle actuator, the first shaft having a first member secured thereon, a second shaft mechanically coupled to the accelerator pedal for rotation in response to the extent to which the accelerator pedal is depressed, the second shaft rotating in a first direction as the accelerator pedal is depressed, the second shaft having a second member secured thereon, a first return spring having a resilient force for urging the second shaft to rotate in a second direction opposite to the first direction, and a second return spring having a resilient force for urging the first shaft to rotate in the first direction opening the throttle valve to abut the second member against the first member.

2. The apparatus as claimed in claim 1, wherein the control circuit includes means for calculating a slip factor, means for comparing the calculated slip factor with a predetermined value, and means for producing a control signal causing the throttle actuator to move the throttle valve in a closing direction when the calculated slip factor is greater than the predetermined value.

3. The apparatus as claimed in claim 1, wherein the first shaft is a hollow shaft, and the second shaft is a drive shaft disposed for rotation within the hollow shaft.

4. The apparatus as claimed in claim 1, wherein the driving force M applied from the throttle actuator to the first shaft is selected as:

$$f < M < F - f$$

where F is the resilient force of the first return spring and f is the resilient force of the second return spring.

5. An apparatus for use in an automobile including an internal combustion engine having an accelerator pedal and a throttle valve situated for rotation within an engine induction passage, comprising:

a throttle driving unit mechanically coupled to the accelerator pedal for rotating the throttle valve in response to an extent to which the accelerator pedal is depressed;

a control circuit for producing an electric control signal in accordance with automobile running conditions; and a throttle actuator responsive to the control signal fed thereto from the control circuit for providing a driving force to the throttle driving unit for rotating the throttle valve;

wherein the throttle driving unit includes means for restricting rotation of the throttle valve in an opening direction to a degree determined by the extent to which the accelerator pedal is depressed, the means for restricting rotation including a first shaft having the throttle valve secured thereon for rotation in unison therewith, the first shaft being drivingly coupled to the throttle actuator, a second shaft mechanically coupled to the accelerator pedal for rotation in response to the extent to which the accelerator pedal is depressed, the second shaft rotating in a first direction as the accelerator pedal is depressed, the second shaft having a member secured thereon, a first return spring having a resilient force for urging the second shaft to rotate in a second direction opposite to the first direction, and a second return spring having a resilient force for urging the first shaft to rotate in the first direction opening the throttle valve to abut the throttle valve against the member of the second shaft.

6. The apparatus as claimed in claim 5, wherein the control circuit includes means for calculating a slip factor, means for comparing the calculated slip factor with a predetermined value, and means for producing a control signal causing the throttle actuator to move the throttle valve in a closing direction when the calculated slip factor is greater than the predetermined value.

7. The apparatus as claimed in claim 5, wherein the first shaft is a hollow shaft, and the second shaft is a drive shaft disposed for rotation within the hollow shaft.

8. The apparatus as claimed in claim 5, wherein the driving force M applied from the throttle actuator to the first shaft is selected as:

$$f < M < F - f$$

where F is the resilient force of the first return spring and f is the resilient force of the second return spring.

* * * * *